United States Patent [19]
Taguchi et al.

[11] 3,901,975

[45] Aug. 26, 1975

[54] PROCESS FOR THE PREPARATION OF A FROZEN DOUGH FOR BAKERY PRODUCTS

[75] Inventors: Keizaburo Taguchi, Fukuoka; Hitomi Tabata, Ranzan; Tomozo Yoshizaki, Tokyo, all of Japan

[73] Assignee: Nisshin Flour Milling Co., Ltd., Tokyo, Japan

[22] Filed: Sept. 25, 1973

[21] Appl. No.: 400,543

[30] Foreign Application Priority Data
Oct. 6, 1972  Japan.................. 47-99895

[52] U.S. Cl.................. 426/23; 426/62
[51] Int. Cl.................. A21d 2/24
[58] Field of Search.................. 426/23, 62

[56] References Cited
UNITED STATES PATENTS

| | | | |
|---|---|---|---|
| 1,222,304 | 4/1917 | Kohman et al. | 426/23 X |
| 1,794,370 | 3/1931 | Frey | 426/62 X |
| 2,147,762 | 2/1939 | Williams | 426/23 |
| 2,434,087 | 1/1948 | Weber | 426/23 |

*Primary Examiner*—Joseph M. Golian
*Attorney, Agent, or Firm*—James C. Haight

[57] ABSTRACT

A frozen dough for bakery products which may ensure the prevention of the reduction in yeast activity during the freezing and thawing of the dough may be prepared by incorporating thereinto a linear $\alpha$-amino dicarboxylic acid containing 4 to 5 carbon atoms, either alone or in combination with a bromic acid salt. The amino acid is to be used in an amount of 0.1 to 1.0% by weight and the bromic acid salt used in an amount of 0.0001 to 0.005% by weight of the flour.

9 Claims, 3 Drawing Figures

PROCESS FOR THE PREPARATION OF A FROZEN DOUGH FOR BAKERY PRODUCTS

BACKGROUND OF THE INVENTION

The present invention relates to a process for the preparation of a frozen dough for bakery products wherein it is envisaged to prevent the reduction in yeast activity during the freezing and defreezing of the dough.

Freezing of baking doughs for the distribution has widely come into effect in the U.S. other and countries and has become more and more important with expansion of freezing-distribution mechanisms. It is appreciated that the use of frozen doughs for baking may bring considerable variations in production, distribution and sales of bakery products to the prior processes. The manufacture of bread using frozen doughs may be carried out in more shortened steps at central bakeries where the doughs are mixed, fermentated, divided, moulded, wrapped, frozen and then distributed without baking. The frozen doughs are bought by customers through dealers and baked in an oven at home; or baked before customers' eyes and sold at a sort of in-store-bakery such as supermarket (bake off method); or manufactured in a central factory in an enterprise and delivered to each branch-factory therein.

Thus, breadmaking with a frozen dough may lead to great effects of intensive mass-production, concentration of factories and facilities, reduction in personnel reduce cost, expansion of sales and delivery territory and so forth. Further, it has an advantage that customers can always eat fresh bread immediately after baking, while according to the conventional breadmaking methods it takes a considerably long time for baked bread to be sold to customers and this tendency has become greater with increase in quantity of production.

The breadmaking process using a frozen dough, however, has a serious problem to be solved, i.e., the reduction in stability of the dough after freezing and thawing, that is, its ability to ferment, expand and make oven spring. This is believed to be due to the reduction in yeast activity and the associated degradation of the dough which are in turn considered to be caused by leakage of reducing substances from dead yeast cells. Various attempts have been made in practice to solve the problem, for example, the use of a larger amount of yeast or the use of a slightly larger quantity of potassium bromate, but all of them are unsatisfactory. Among various kinds of breads, those of lean formulae such as white bread are generally susceptible to significant degradation and thus few of them are actually circulated as breads using frozen doughs. At present only Danish pastry and the like are ciculated, which are of rich formulae.

In the production of bread using a frozen dough, there may occur a reduction in stability of the dough which is associated with freezing and thawing. It is appreciated that said reduction may be caused by degradation of the dough due to leakage of reducing substances (predominantly glutathione), the latter being brought about by reduction in activity and death of the yeast previously added. From these viewpoints, various techniques, including a decrease in fermentation time before freezing, an increase in quantity of yeast used and the addition of $KBrO_3$ have been proposed, but none of them are, in effect, satisfactory.

SUMMARY OF THE INVENTION

As a result of our careful study, we have now found that the addition of a linear α-amino dicarboxylic acid containing 4 to 5 carbon atoms, namely glutamic acid or aspartic acid, to a dough for bakery products can allow the prevention of reduction in activity of yeast during the freezing and thawing of the dough, and that this effect may be rendered much more significant by the combined use of said amino acid and a bromic acid salt.

According to the present invention, therefore, there is provided a process for the preparation of a frozen dough for bakery products, which comprises adding to a dough formulation comrpsing flour 0.1 to 1.0% by weight of the flour of a linear α-amino dicarboxylic acid containing 4 to 5 carbon atoms which is in free form, thoroughly mixing the dough formed and then freezing the resulting dough.

In a preferred embodiment of the invention, 0.0001 to 0.005% by weight of the flour of a bromic acid salt is also added in combination with the amino acid.

DESCRIPTION OF THE PREFERRED EMBODIMENTS

The function and mechanism of the α-amino dicarboxylic acid and the bromate by which the effect as mentioned above may be brought about is not clearly understood, although both a protective effect inhibiting the reduction in yeast activity and a toughening effect for the dough have been clearly observed from experimental results. The chemical structures of aspartic acid and glutamic acid are similar to each other as shown below, but is not yet apparent what is implied by this similarity.

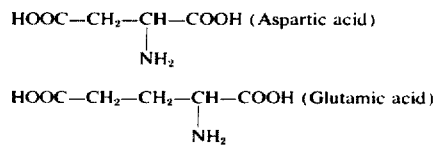

Figure 1:
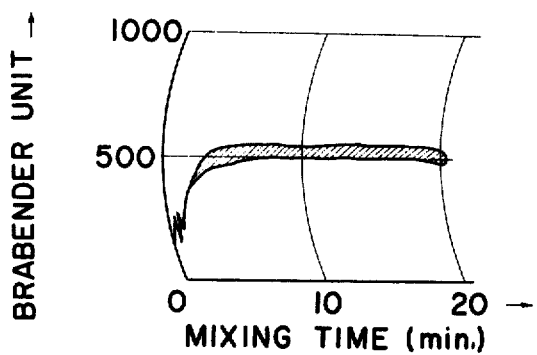
Figure 2:
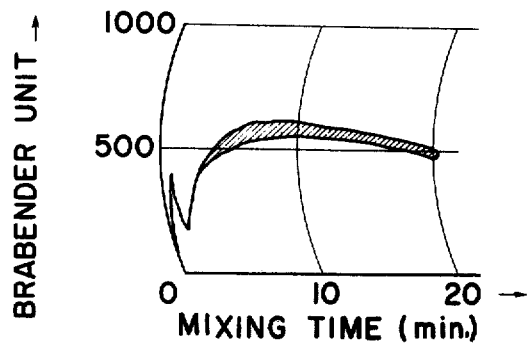
Figure 3:
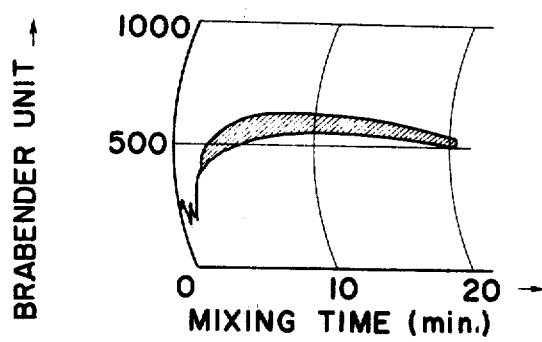

The toughening effect has been confirmed by Farinographs shown in FIGS. 1, 2 and 3 of the accompanying drawing.

FIG. 1 shows a Faringram with strong flour at a water absorption of 69%.

FIG. 2 with a strong flour at the same water absorption to which 0.55% by weight of glutamic acid is added; and FIG. 3 with a strong flour at the same water adsorption to which 0.50% by weight of aspartic acid is added. These show that the toughening effect for the dough is better in FIGS. 2 and 3 than in FIG. 1.

As defined above, the amount of the α-amino dicarboxylic acid to be added is, in free form, 0.1 to 1.0% by weight of the flour. An amount of less than 0.1% is insufficient to give a satisfactory effect, while an amount of more than 1.0% does not always bring about a better effect, so that the maximum amount is desirably 1.0% from an economical viewpoint. The amount of the bromate added is determined in the range 0.0001 to 0.005% by weight which is sanitarily acceptable and may achieve the desired effect.

These additives may be added to the dough formulation in a conventional manner. For example, they are added by dissolving them in water on preparing a flour dough for bakery products, or added in powder forms such as, although a better result can be obtained by the former procedure.

The present invention is further illustrated, but in no way limited by the following examples in which all parts are by weight.

EXAMPLE 1

A dough formulation of the following composition was prepared:

|  | Parts |
|---|---|
| Flour | 100 |
| Sugar | 4 |
| Common salt | 2 |
| Shortening | 4 |
| Compressed yeast (Commercially available) | 3 |
| Water | 62 |

To the formulation was added a solution of 0.55 parts of glutamic acid in 62 parts of water, followed by mixing in a mixer in a usual manner to form a dough. The dough was fermented at 28°C for 30 minutes, then divided into pieces each of 200 g weight and benched at 28°C for 20 minutes. Thereafter, the dough was moulded in a moulder, frozen by a normal air-blast method and then stored at −20°C for a period of 1 to 4 weeks. After the lapse of this period, the frozen dough was placed in a one loaf-shaped case, which was subjected to proofing at 38°C to expand it to a definite volume, followed by baking in an oven.

By way of comparison, the same procedure as described above was repeated except that no glutamic acid was added.

The results obtained are listed below:

|  | Period of storage at −20°C (weeks) | | | Reference* (Not frozen) |
|---|---|---|---|---|
|  | 1 | 2 | 4 |  |
| Volume of bread for comparison (ml) | 730 | 710 | 640 | 820 |
| Volume of bread in Example 1 (ml) | 860 | 860 | 810 | 890 |

* The dough was placed in a one loaf-shaped case to carry out proofing and baking directly after the moulding.

The bread obtained with the frozen dough free from glutamic acid was coarse in its crust and tinged with many spots. Moreover, it had an inferior texture and grain. On the other hand, the bread from the frozen dough containing glutamic acid was smooth in its crust and had few spots and a superior texture and grain.

EXAMPLE 2

Bread was prepared by the same procedure as in Example 1 except that glutamic acid was replaced by 0.50 parts of aspartic acid. A control for comparison was carried out without addition of aspartic acid.

The results thus obtained are set forth below:

|  | Period of storage at −20°C (weeks) | | | Reference (Not frozen) |
|---|---|---|---|---|
|  | 1 | 2 | 4 |  |
| Volume of bread for comparison (ml) | 730 | 710 | 640 | 820 |
| Volume of bread in Example 2 (ml) | 870 | 830 | 800 | 880 |

Similarly, the bread from the frozen dough containing aspartic acid was superior in every respect of its crust, texture and grain to the bread not containing the acid.

EXAMPLE 3

A formulation of the following composition was prepared:

|  | Parts |
|---|---|
| Flour | 100 |
| Sugar | 4 |
| Common salt | 2 |
| Shortening | 4 |
| Compressed yeast | 3 |
| Glutamic acid | 0.55 |
| Potassium bromate | 0.004 |
| Water | 62 |

The formulation was mixed in a mixer in a usual manner to form a dough. The dough was fermented at 28°C for 60 minutes, then divided into pieces each of 200 g weigh and benched at 28°C for 20 minutes. Thereafter, the dough was moulded in a moulder, frozen by a normal air-blast method and then stored at −20°C for a period of 1 to 4 weeks. After the lapse of this period the frozen dough was subjected to further stages as described in Example 1. By way of comparison, the same procedure as above was repeated except that neither glutamic acid nor potassium bromate was added.

The results obtained are shown below:

|  | Period of storage at −20°C (weeks) | | | Reference (Not frozen) |
|---|---|---|---|---|
|  | 1 | 2 | 4 |  |
| Volume of bread for comparison (ml) | 550 | 510 | 460 | 900 |
| Volume of bread in Example 3 (ml) | 830 | 820 | 820 | 850 |

Usually, a noticeable reduction in volume occurs with a longer period of fermentation before freezing. Nevertheless, the bread obtained from the frozen dough containing glutamic acid and potassium bromate was slightly reduced in volume and superior in its crust, texture and grain over that free from the additives.

EXAMPLE 4

Bread was prepared by the same procedure as in Example 3 except that glutamic acid was replaced by 0.50 parts of aspartic acid. A control for comparison was carried out without addition of aspartic acid and potassium bromate.

The results thus obtained are set forth below:

| | Period of storage at −20°C (weeks) | | | Reference (Not frozen) |
|---|---|---|---|---|
| | 1 | 2 | 4 | |
| Volume of bread for comparison (ml) | 550 | 510 | 460 | 900 |
| Volume of bread in Example 4 (ml) | 830 | 820 | 780 | 840 |

Similarly, the bread of the frozen dough containing aspartic acid and potassium bromate was slightly reduced in volume and superior in every respect of its crust, texture and grain over that free from the additives.

We claim:

1. In a process for preparing a frozen dough by fermenting a dough composition comprising flour, yeast and water and freezing the resultant fermented dough for subsequent baking, the improvement which comprises:
freezing a dough composition containing an additive consisting essentially of 0.1–1% by weight, based on the weight of said flour, of at least one linear α-aminodicarboxylic acid selected from the group consisting of glutamic acid and aspartic acid admixed therein.

2. A process according to claim 1, wherein said dough composition further comprises 0.0001–0.005% by weight, based on the weight of the flour, of a bromic acid salt.

3. A process according to claim 2, where in said bromic acid salt is potassium bromate.

4. A process according to claim 2, wherein said α-aminodicarboxylic acid is glutamic acid.

5. A process according to claim 2, wherein said α-aminodicarboxylic acid is aspartic acid.

6. In a frozen dough prepared by fermenting a dough composition comprising flour, yeast and water and freezing the resultant fermented dough for subsequent baking, the improvement which comprises:
0.1–1.0% by weight, based on the weight of said flour, of at least one linear α-aminodicarboxylic acid selected from the group consisting of glutamic acid and aspartic acid admixed therein.

7. A composition according to claim 6, further comprising 0.0001–0.005% by weight, based on the weight of the flour, of a bromic acid salt.

8. A composition according to claim 7, wherein said bromic acid salt is potassium bromate.

9. A composition according to claim 8, wherein said dough is a bread dough.

\* \* \* \* \*